United States Patent
Gall et al.

(10) Patent No.: US 9,977,703 B2
(45) Date of Patent: May 22, 2018

(54) SUBSCRIBER-BASED EVENT SUBSCRIPTION

(75) Inventors: Michael Gall, Copenhagen (DK); Michael Fruergaard Pontoppidan, Lynge (DK)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1235 days.

(21) Appl. No.: 13/350,252

(22) Filed: Jan. 13, 2012

(65) Prior Publication Data
US 2013/0185733 A1   Jul. 18, 2013

(51) Int. Cl.
G06F 9/54 (2006.01)

(52) U.S. Cl.
CPC .................................. *G06F 9/542* (2013.01)

(58) Field of Classification Search
None
See application file for complete search history.

(56) References Cited

U.S. PATENT DOCUMENTS

| | | | |
|---|---|---|---|
| 6,185,728 B1* | 2/2001 | Hejlsberg | 717/109 |
| 6,268,852 B1* | 7/2001 | Lindhorst et al. | 715/744 |
| 6,275,232 B1* | 8/2001 | Cataudella et al. | 715/815 |
| 6,625,804 B1* | 9/2003 | Ringseth et al. | 717/114 |
| 6,951,022 B1* | 9/2005 | Golde et al. | 719/318 |
| 7,478,405 B2 | 1/2009 | Hinson et al. | |
| 7,487,512 B2 | 2/2009 | Brunswig et al. | |
| 7,559,065 B1 | 7/2009 | Sosnovsky et al. | |
| 2006/0136256 A1* | 6/2006 | Roots et al. | 705/1 |
| 2006/0161907 A1* | 7/2006 | Newport et al. | 717/151 |
| 2010/0332968 A1 | 12/2010 | Squillace | |
| 2011/0219384 A1* | 9/2011 | Clark et al. | 719/318 |

OTHER PUBLICATIONS

Damm, et al., "Linguistic Support for Distributed Programming Abstractions", Retrieved at «http://ieeexplore.ieee.org/stamp/stamp.jsp?tp=&arnumber=1281589», Proceedings of the 24th International Conference on Distributed Computing Systems (ICDCS), 2004, pp. 244-251.

Liang, et al., "A New General Approach to Model Event Handling", Retrieved at «http://ieeexplore.ieee.org/stamp/stamp.jsp?tp=&arnumber=5614916», Proceedings of the Fifth International Conference on Software Engineering Advances, Aug. 28, 2010, pp. 14-19.

Jayaram, et al., "Program Analysis for Event-Based Distributed Systems", Retrieved at «http://www.jayaramkr.com/files/Jayaram-Eugster-DEBS11.pdf», Proceedings of the 5th ACM International Conference on Distributed Event-Based System, Jul. 11-15, 2011, pp. 113-124.

Meyer, Bertrand, "The Power of Abstraction, Reuse and Simplicity: An Object-Oriented Library for Event-Driven Design", Retrieved at <<http://citeseerx.ist.psu.edu/viewdoc/download;jsessionid=EDCE8DDF2F9B66A5A12E709A7C6D207D?doi=10.1.1.14.6296&rep=rep1&type=pdf»>, Lecture Notes in Computer Science vol. 2635, 2003, pp. 1-45.

* cited by examiner

*Primary Examiner* — Syed Roni
(74) *Attorney, Agent, or Firm* — Christopher J. Volkmann; Kelly, Holt & Christenson, PLLC (57) ABSTRACT

An event subscriber subscribes to an event. When the event occurs, the publisher calls into a framework to look for subscriber attributes on program entities and raises the event with program entities that contain the correct attributes.

20 Claims, 10 Drawing Sheets

SUBSCRIBER-BASED EVENT SUBSCRIPTION

BACKGROUND

In many current computing systems, events are used to communicate happenings of interest between objects. For instance, events enable a class or object to notify other classes or other objects when something of interest occurs. The class that sends (or raises) the event is known as the publisher and the classes that receive (or handle) the event are known as subscribers or event handlers.

By way of example, an object may subscribe to events raised by controls on a user interface, such as buttons, list boxes, or other types of controls. The publisher (the object representing the control) determines when the event is raised and subscribers determine the action to be taken in response to the event.

Programmers often write custom code that is called when a given event is raised. For instance, code may take an action that the programmer wants to perform when a user clicks on a certain button in a given context.

In many conventional computing languages such as C# and Java, event subscription is dynamic. This means that in order to subscribe to an event, the subscriber requires an instance of the class raising the event (an instance of the publisher). By way of example, in one language, in order to subscribe to an event, the addition assignment operator (+=) is used to attach an event handler to an event.

Assume, for instance, that an object named Publisher has an event RaiseCustomEvent. The following code in Table 1 is in the language C#. The BankAccount class raises an event whenever a withdrawal occurs. The TextOnWithdrawal class is subscribing to the event. For instance, the subscriber will send a text message to the account owner whenever any withdrawal occurs. The Program class uses the BankAccount class and initiates a withdrawal:

TABLE 1

```
public class BankAccount
{
  public delegate void WithDrawalDelegate(decimal amount);
  public event WithDrawalDelegate onWithDrawal;
  public void WithDraw(decimal amount)
  {
    //Raise the event
    onWithDrawal(amount);
    // ...
  }
}
public class TextingOnWithDrawal
{
  public static void onWithDrawal(decimal amount)
  {
    // Send text message
  }
}
class Program
{
  static void Main(string[ ] args)
  {
    BankAccount bankAccount = new BankAccount( );
    bankAccount.onWithDrawal +=
    TextingOnWithDrawal.onWithDrawal;
    bankAccount.WithDraw(500);
  }
}
```

In the example in Table 1, it can be seen that the Subscriber class requires an instance of the Publisher class that is raising the event. That is, the += operator is used to attach the TextingOnWithDrawal event handler to the onWithdrawal event raised by the publisher BankAccount. This can result in a number of problems. Construction of various class instances are typically spread across an entire code base. In fact, they can even reside in code bases outside the influence of the subscriber (such as in a dependent assembly). Therefore, the changes required to connect dynamic events are at best intrusive, and at worst impossible.

Attributes are also widely used in current computing languages. Attributes provide a method to associate metadata or declarative information with code (such as a program entity like a type, a method, a property or an assembly). In essence, attributes add metadata to a program entity. After an attribute is associated with a program entity, the attribute can be queried at runtime using a process known as reflection.

Metadata is information about the program entities defined in a program. In various languages, one or more attributes can be applied to entire assemblies, modules, or smaller program entities like classes and properties. Attributes can normally accept arguments just like methods and properties.

By way of specific example, in the computing language C#, attributes can be specified. They are specified by placing the attribute name in square brackets above the declaration of the entity that the attribute applies to. The target of an attribute is the entity to which it applies.

The discussion above is merely provided for general background information and is not intended to be used as an aid in determining the scope of the claimed subject matter.

SUMMARY

An event subscriber subscribes to an event. When the event occurs, the publisher calls into a framework to look for subscriber attributes on program entities and raises the event with program entities that contain the correct attributes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
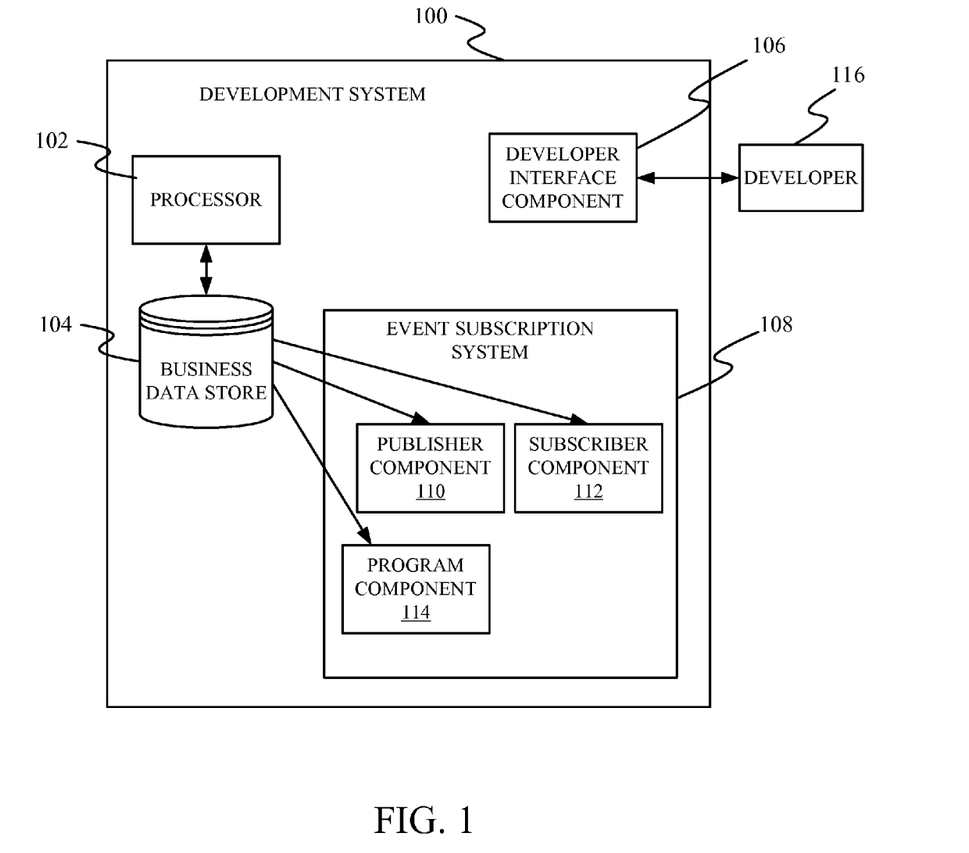
FIG. 1 is a block diagram of one illustrative development system.

FIG. 1 is a block diagram of one illustrative embodiment of a development system 100. System 100 includes processor 102 with data store 104, as well as developer interface component 106 and event subscription system 108. Event subscription system, itself, illustratively includes publisher component 110, subscriber component 112, and program component 114.

In one embodiment, processor 102 is illustratively a computer processor with associated timing and storage circuitry (not shown). Processor 102 is illustratively coupled to, and activated by, the other components of the system. Processor 102 illustratively enables the functionality of those components and is thus a functional component of system 100.

In the embodiment shown in FIG. 1, development system 100 can be used by developer 116 in order to cause subscriber entities to subscribe to events of publisher entities using event subscription system 108. Subscribers (or event handlers) subscribe to events by associating a characteristic with the subscriber indicative of the subscription. In one embodiment, a subscriber subscribes to an event by expressing a subscriber attribute on the subscriber (or event handler). While the present discussion proceeds with respect to the characteristic being an attribute on the subscriber, other characteristics can be associated with the subscriber and some of those are discussed below. In any case, associating a characteristic with the subscriber to subscribe to an event provides static event subscription so that a subscriber or program entity that subscribes to an event need not refer to an instance of the entity raising the event (i.e., the publisher). The logic used to determine if the characteristic matches an event can be dynamic, as described below.

Figure 2:
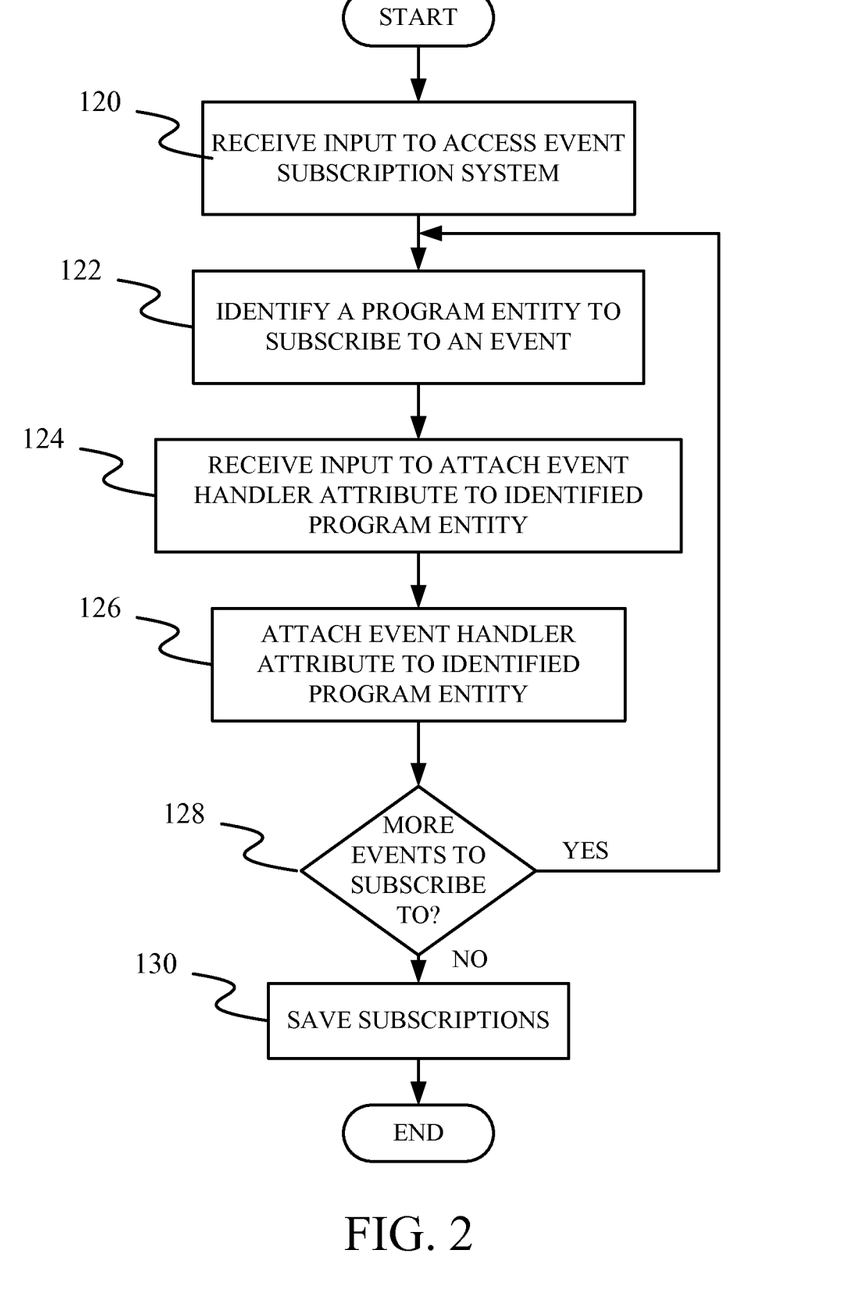
FIG. 2 is a flow diagram of the operation of the system shown in FIG. 1 in accordance with one embodiment.

FIG. 2 is a flow diagram illustrating one embodiment of the operation of system 100 in facilitating the subscription of events to subscribers. First, developer interface component 106 illustratively generates a user interface to developer 116, which includes mechanisms by which developer 116 can interact with development system 100. In doing so, developer 116 illustratively indicates that he or she wishes to cause certain program entities or subscribers to subscribe to certain events of publishers. Thus, development system 100 receives a developer input to access event subscription system 108. This is indicated by block 120 in FIG. 2.

In the embodiments shown in FIG. 1, data store 104 illustratively includes business data used by business programs or business applications, such as customer resource management (CRM) applications, enterprise resource planning (ERP) systems, etc. Therefore, developer 116 illustratively accesses subscriber component 112 or program component 114 and identifies entities in data store 104 that the developer 116 wishes to have subscribe to events. Identifying a program entity to subscribe to an event is indicated by block 122 in FIG. 2.

Program entities can illustratively include assemblies, modules, classes, properties, methods, types, etc. Once developer 116 has identified a program entity (such as a method) that the developer wants to subscribe to an event, the developer provides another input to attach an event handler attribute to the identified program entity (or subscriber). This is indicated by block 124 in FIG. 2.

Developer 116 then uses program component 114 and publisher component 110, as well as subscriber component 112, to attach the event handler attribute to the identified program entity (i.e., to the subscriber). This is indicated by block 126 in FIG. 2.

Event subscription system 108 then determines whether there are more events to subscribe to. This can be done by asking developer 116 through developer interface component 106. If so, then processing reverts to block 122 where programming entities that are going to subscribe to an event are identified and the event handler attributes are input by developer 116 and attached to those program entities. If not, then the current subscriptions that have just been made are saved to business data store 104. Of course, they can be stored elsewhere as well. Storing them in business data store 104 is given by way of example only. Determining whether there are more events to subscribe to, and saving the subscriptions just input are indicated by blocks 128 and 130 in FIG. 2, respectively.

Figure 3:
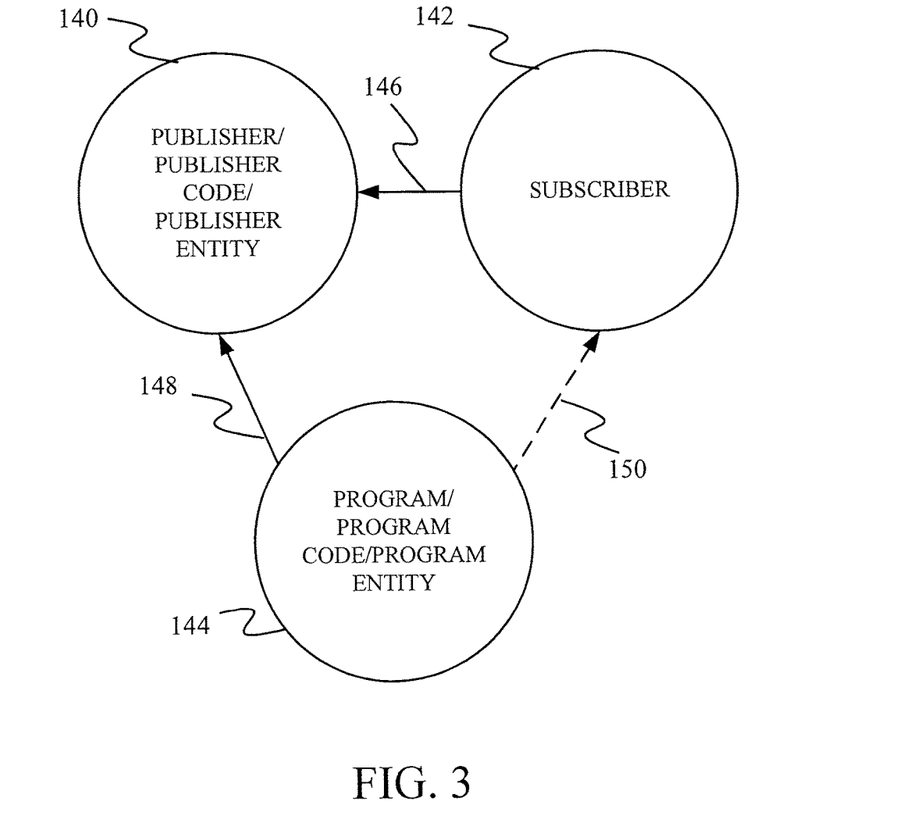
FIG. 3 shows a code dependency diagram.

FIG. 3 is a code dependency diagram illustrating dependencies in conventional systems, and using the current system. In a conventional system, such as in the example discussed above in the background in Table 1, it can be seen that publisher code 140, subscriber code 142 and program code 144 all have interdependencies. That is, the program entity 144 is dependent on the publisher entity 140. In order for program entity 144 to subscribe to an event raised by publisher 140, the subscriber 142 must have reference to both program entity 144 and the publisher 140. This is indicated by arrows 146, 148 and 150. However, using the present system, because it is static in that the subscriber simply needs to be decorated with an event handler attribute corresponding to the event raised by the publisher, the program entity 144 is not dependent on the subscriber 142 and need not have a reference to the publisher entity that is raising the event. Therefore, arrow 150 is eliminated, and this is indicated by the dashed line in arrow 150. This eliminates the need to inject any intrusive code anywhere in order to subscribe to an event.

One example of code that shows how the present system is used in subscribing to an event is as follows:

TABLE 2

```
public class BankAccount
{
  public delegate void WithDrawalDelegate(decimal amount);
  public event WithDrawalDelegate onWithDrawal;
  public void WithDraw(decimal amount)
  {
    //Raise the event
    Eventing.Raise(this, "onWithDrawal", amount);
    // ...
  }
}
public class TextingOnWithDrawal
{
  [EventHandlerAttribute("BankAccount.onWithDrawal")]
  public static void onWithDrawal(decimal amount)
  {
    // Send text message
  }
}
class Program
{
  static void Main(string[ ] args)
  {
    BankAccount bankAccount = new BankAccount( );
    bankAccount.WithDraw(500);
  }
}
```

The code in this example is in C#. It can be seen that, in one embodiment, an eventing class is used in the public class TextingOnWithdrawal, and the event subscription attribute (or event handler attribute) is applied to the onWithdrawal class. The subscriber does not need an instance of the publisher to subscribe to the event. Instead, when the onWithDrawal event is raised, the system scans through all classes to identify classes with the event handler attribute for the onWithDrawal event. When one is found, that means the class containing the attribute has subscribed to that event. Therefore, a method is invoked so that the subscriber receives the event. This is described in greater detail below with respect to FIGS. 4 and 5.

Figure 4:
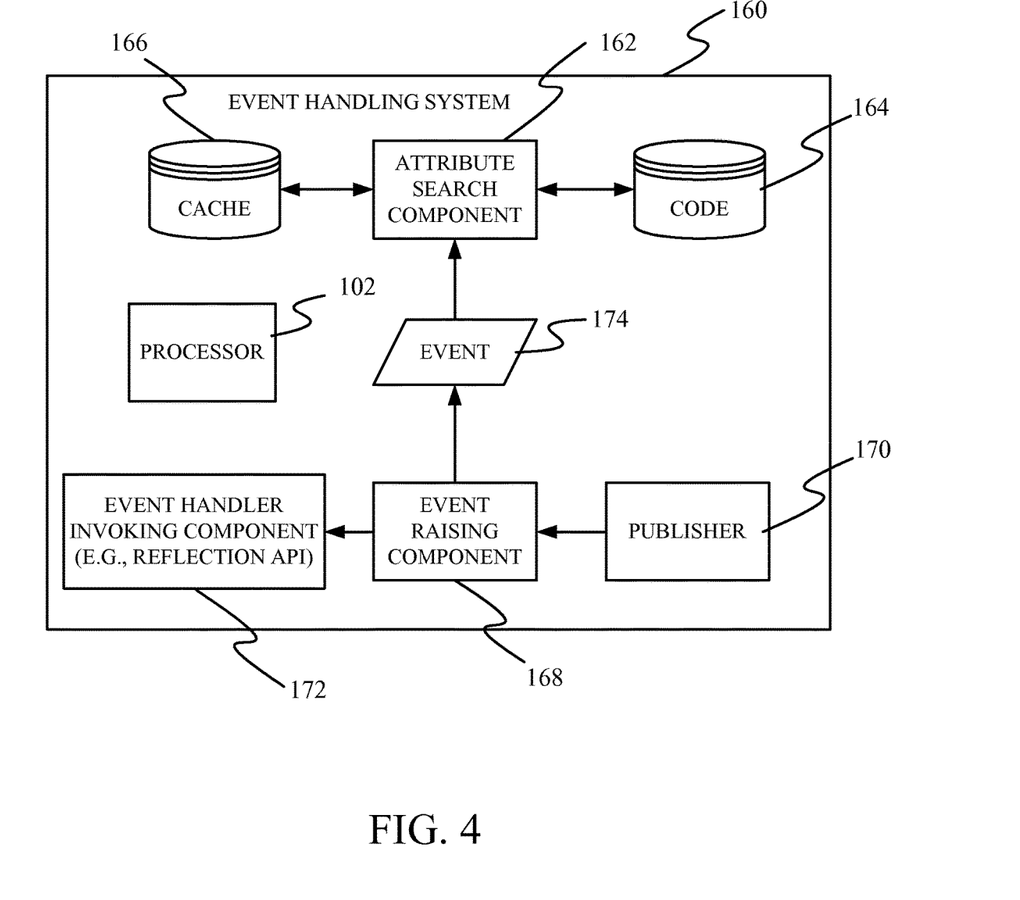
FIG. 4 is a block diagram of one illustrative event handling system.

FIG. 4 shows a block diagram of one embodiment of an event handling system 160. Event handling system 160 is used, during runtime, in order to publish events raised by publishers to subscriber entities. FIG. 4 shows that event handling system 160 illustratively includes attribute search component 162 that is coupled to code 164 and a cache 166. FIG. 4 also shows that system 160 includes event raising component 168 that detects when an event is raised by a publisher 170 and also accesses an event handler invoking component 172 to invoke a method that sends the event 174 raised by publisher 170 to the subscriber.

Figure 5:
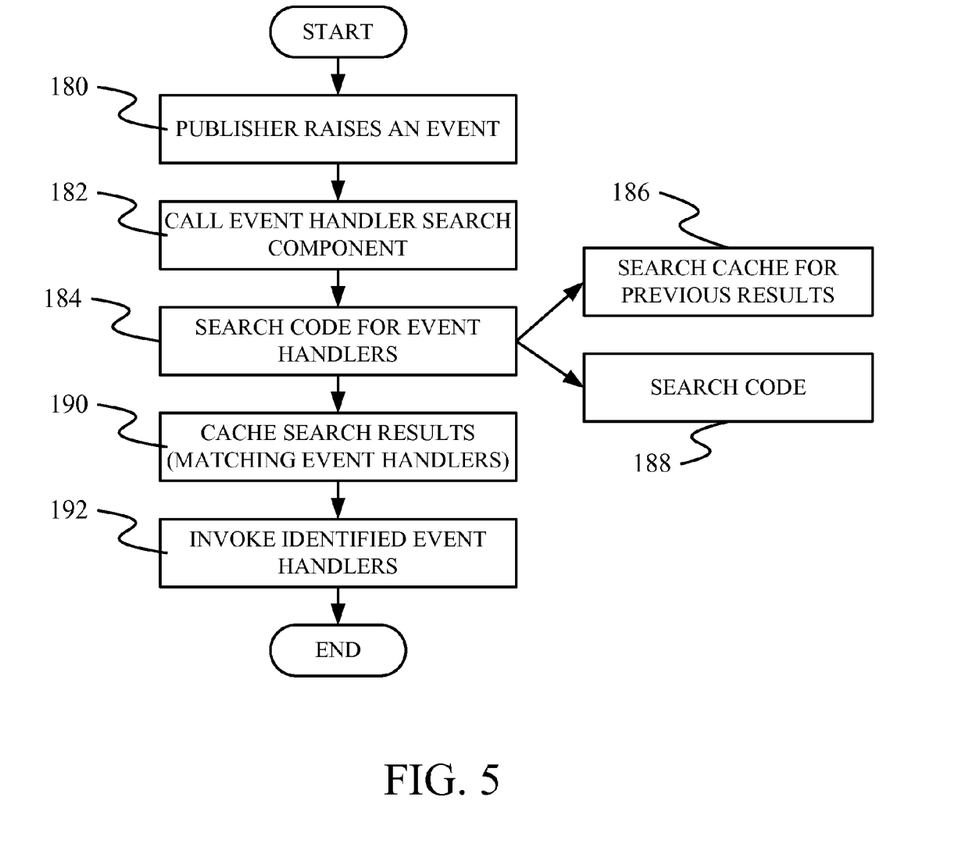
FIG. 5 is a flow diagram illustrating one embodiment of the operation of the system shown in FIG. 4.

FIG. 5 is a flow diagram illustrating one embodiment in which event handling system 160 publishes an event, when it is raised, to a subscriber. First, event raising component 168 determines that a publishing class 170 has raised an event. This is indicated by block 180 in FIG. 5. Event raising component 168 then calls attribute search component 162 based on the event 174. Calling search component 162 is indicated by block 182 in FIG. 5. Attribute search component 162 then searches code 164 for event handlers that have subscribed to event 174. The event handlers identified will be those classes that have the event handler attribute corresponding to event 174 attached thereto. This is indicated by block 184 in FIG. 5.

This can be done in a number of different ways. In one embodiment, attribute search component 162 uses any kind of type inspecting interface to inspect other classes for the event handler attribute. By way of example only, in C# this can be done using reflection. In any model driven language, database queries can be used to locate the subscribers that have the matching event handler attribute attached thereto.

In any case, when an event is raised for the first time, attribute search component 162 illustratively searches all classes in code 164 for the event handler attribute. As they are located, they are illustratively placed in cache 166 and associated with the raised event. The next time that same event is raised, attribute search component 162 illustratively starts by searching cache 166 for the subscribers and can also search code 164 as well, although searching code 164 can be avoided if cache 166 is searched first. Searching cache 166 for previous search results based on the event 174 that has just been raised expedites the process and is indicated by block 186 in FIG. 5. Searching code 164 is indicated by block 188.

After attribute search component 162 has conducted the search for event handlers, it caches the search results by storing the matching event handlers in cache 166. This is indicated by block 190 in FIG. 5.

Event handler invoking component 172 then invokes the identified event handlers, which are identified by attribute search component 162 as being subscribers to event 174. This can be done in a wide variety of ways as well. In one embodiment, event handler invoking component 172 simply uses a reflection API on the identified event handlers, although other ways of invoking the event handlers based on event 174 can be used as well. Invoking the identified event handlers is indicated by block 192 in FIG. 5.

It will also be noted that, in accordance with one embodiment, the attributes described herein have names and parameters for sake of example only, but others can be used as well. For instance, the event handler attribute discussed herein is a string and is parameterized by a string, but anything could be used to identify an event on a class. In fact, while the present discussion has proceeded with respect to using an attribute on the subscriber to subscribe to an event, this can be done without necessarily using an attribute. Anything on the subscriber could be used in the same static way. For instance, depending on the language, a text comment can be used on the subscriber. In that embodiment, instead of attribute search component 162 scanning the classes for attributes, a text search component can be used to scan the entities for specified text comments that identify an event subscription. Alternatively, the subscriber characteristics can be identified in a variety of other ways, such as records in a database, configuration in an extensible markup language (XML) file, or other ways. In each case, a suitable component is used as component 162 to search for characteristics that identify a subscriber to a given event. Similarly, while some examples have been given above in the C# language, any language that supports eventing as being identified in other ways (such as using a text comment) can be used as well.

It should be noted that the systems and components shown in FIGS. 1 and 4 are exemplary only. Their functions could be further divided into more components and systems or combined into fewer. Also, they can be deployed in many architectures such as on a client device, hosted on a server, divided among one or more clients and one or more servers, or in a cloud computing architecture.

Figure 6:
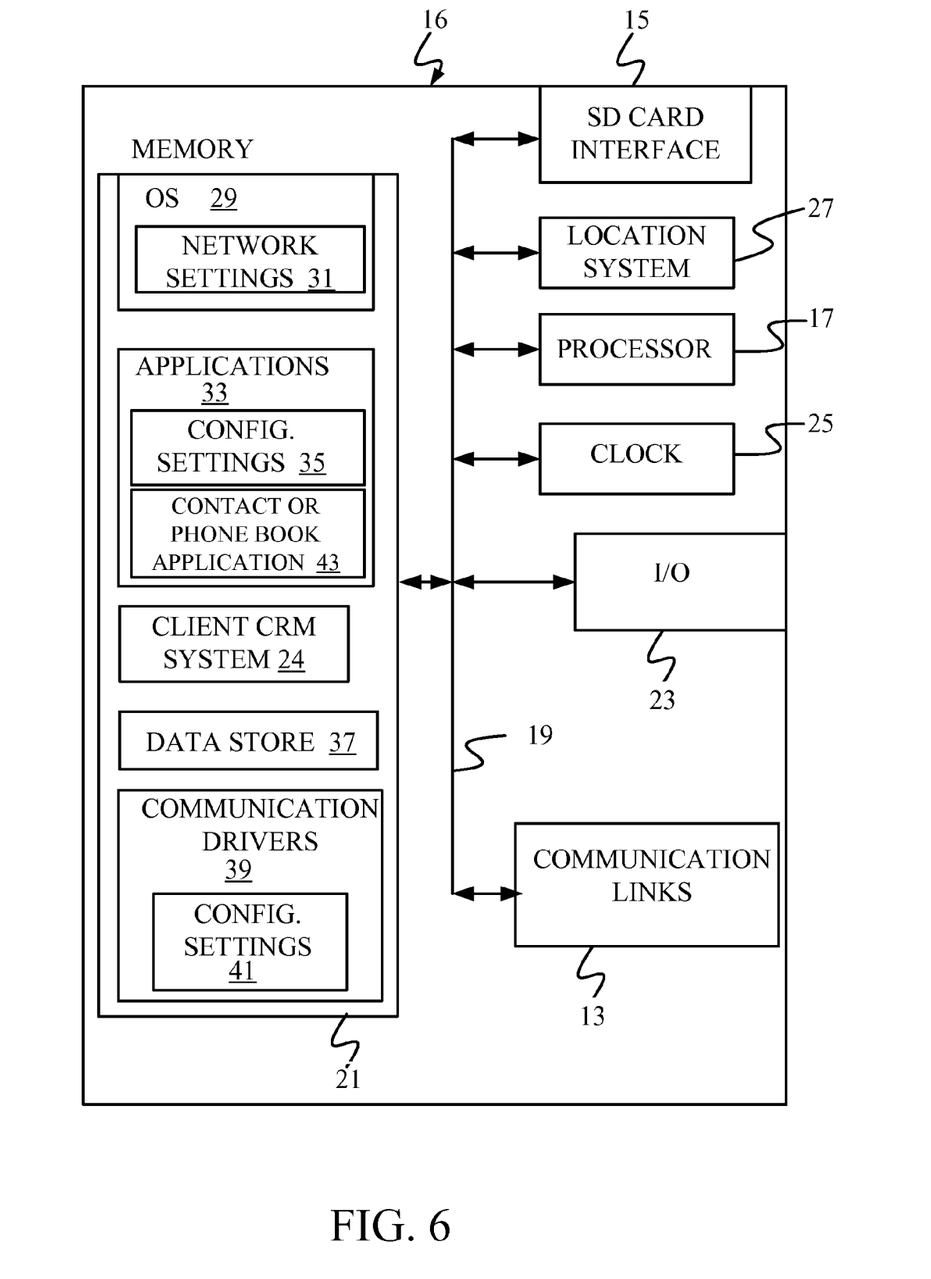
FIGS. 6-8 show different embodiments of mobile devices.
Figure 6A:
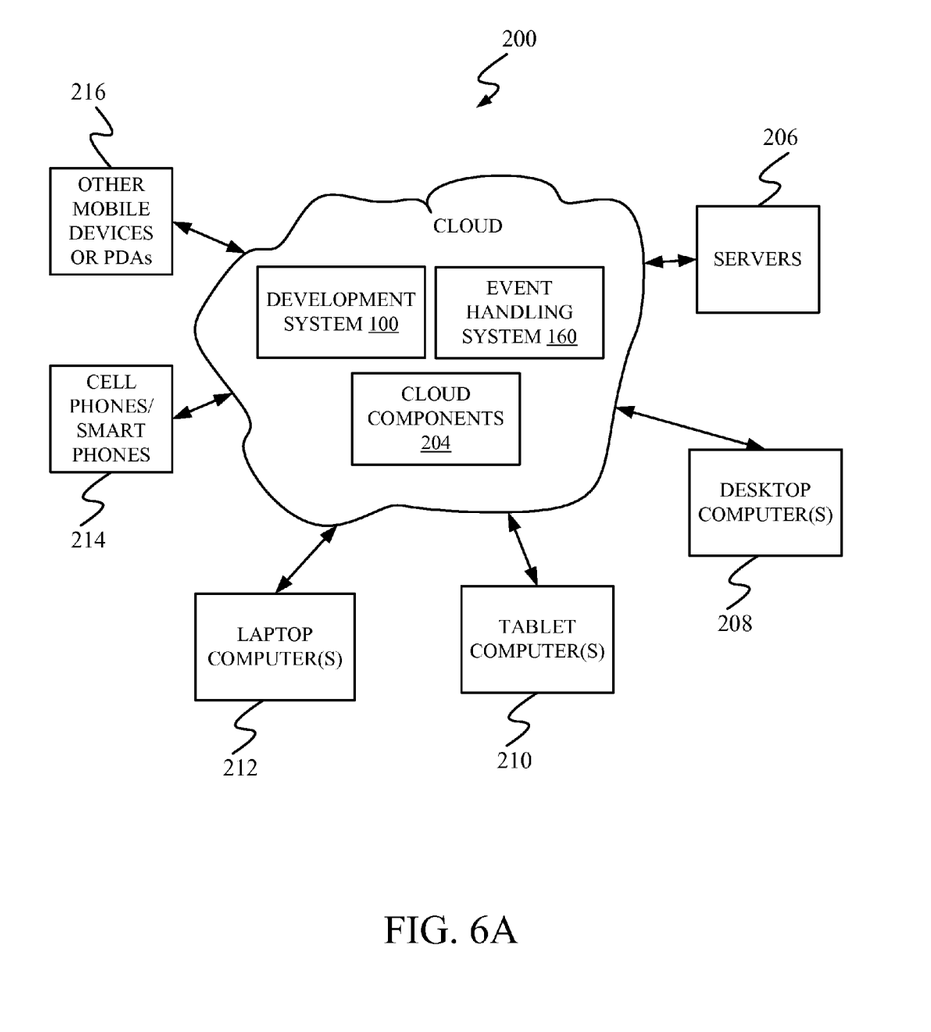
FIG. 6A is a block diagram of one illustrative cloud computing architecture.

FIG. 6A shows one illustrative cloud computing architecture 200 in which the system can be deployed. Architecture 200 includes cloud 202 that has cloud component 204, which may include, or be separate from, systems 100 and 160. Components 204 illustratively include infrastructure, platforms and applications. Cloud 202 is coupled to other devices or systems such as cloud servers 206, desktop computers 208, tablet computers 210, laptop computers 212, cellular phones or smart phones 214 or other mobile devices or personal digital assistants 215. Computing provides computation, software, data access, and storage services, rather than products, that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of systems 100 and 160 as well as the corresponding data, can be stored on servers at a remote location in cloud 200. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on a client device directly, or in other ways.

Figure 7:
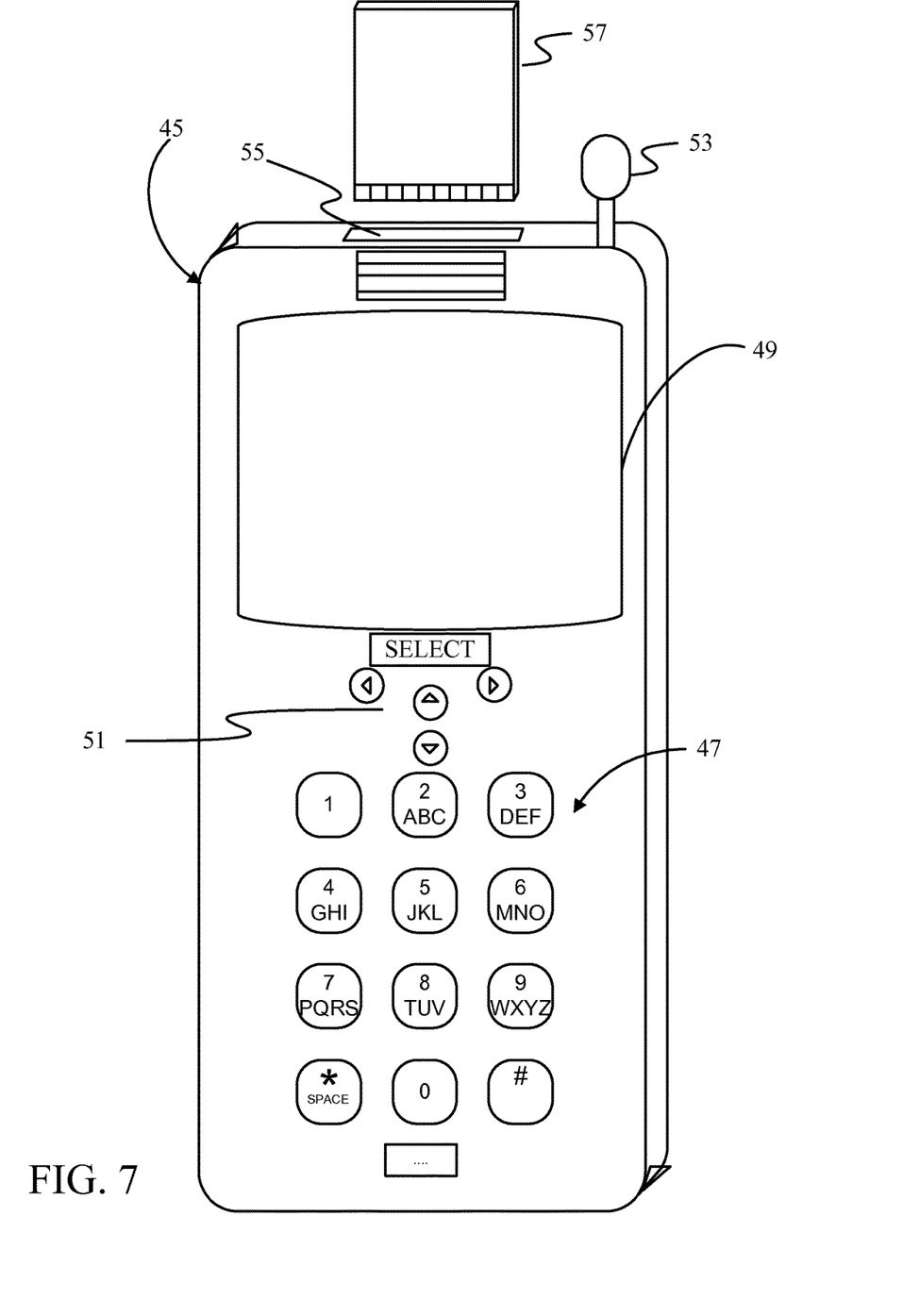

In any case, FIG. 6 is a simplified block diagram of one illustrative embodiment of a handheld or mobile computing device that can be used as a client device, in which the present system can be deployed. FIGS. 6 and 7 are examples of handheld or mobile devices.

FIG. 6 provides a general block diagram of the components of a client device 16 that can run components of system 100 or 160 or that interacts with system 100 or 160, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like system 100 or 160) are received on a removable Secure Digital (SD) card that is connected to a SD card interface 15. SD card interface 15 and communication links 13 communicate with a processor 17 (which can also embody processor 102 from FIGS. 1 and 4) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. System 100 or 160 or the items in data store 104, 164 or 166, for example, can reside in memory 21. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 8:
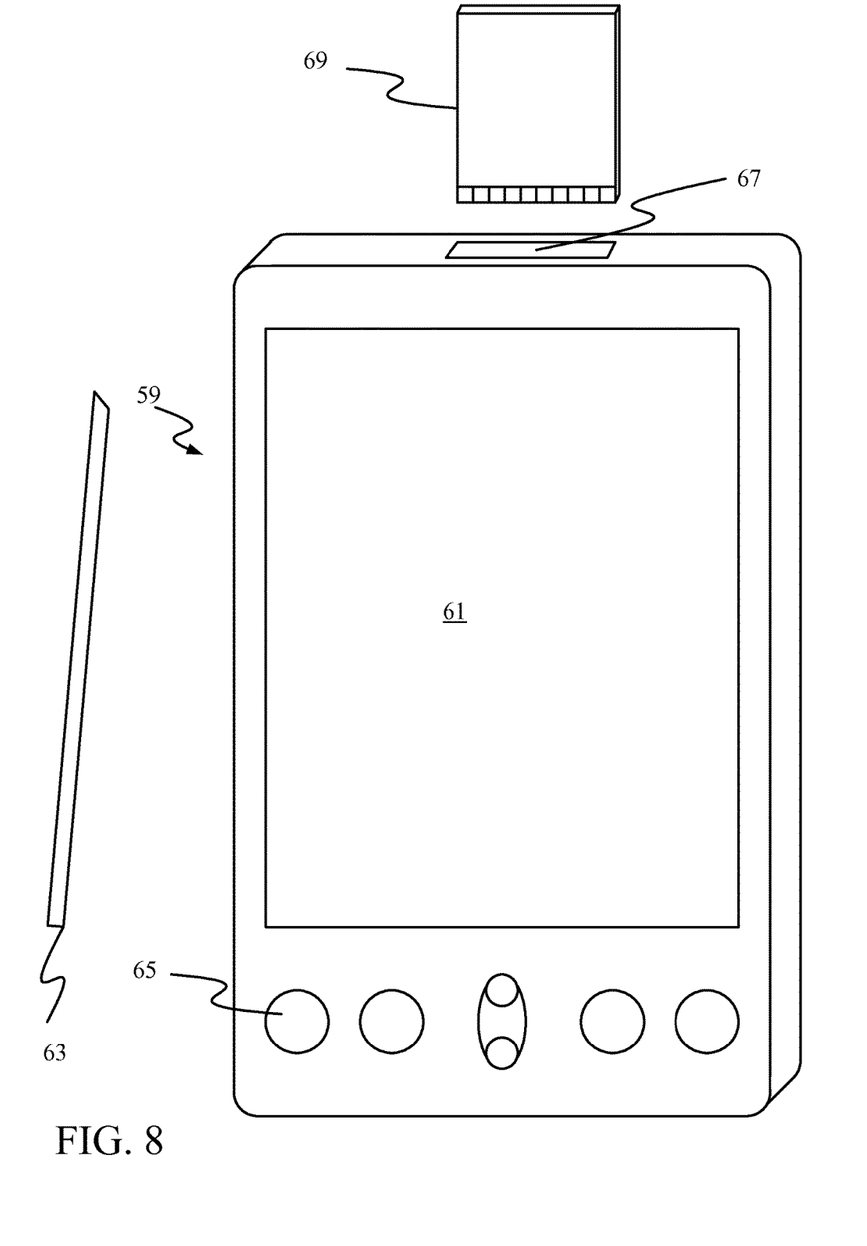

FIGS. 7 and 8 provide examples of devices 16 that can be used, although others can be used as well. In FIG. 7, a smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 8 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Note that other forms of the devices 16 are possible. Examples include tablet computing devices, music or video players, and other handheld computing devices.

Figure 9:
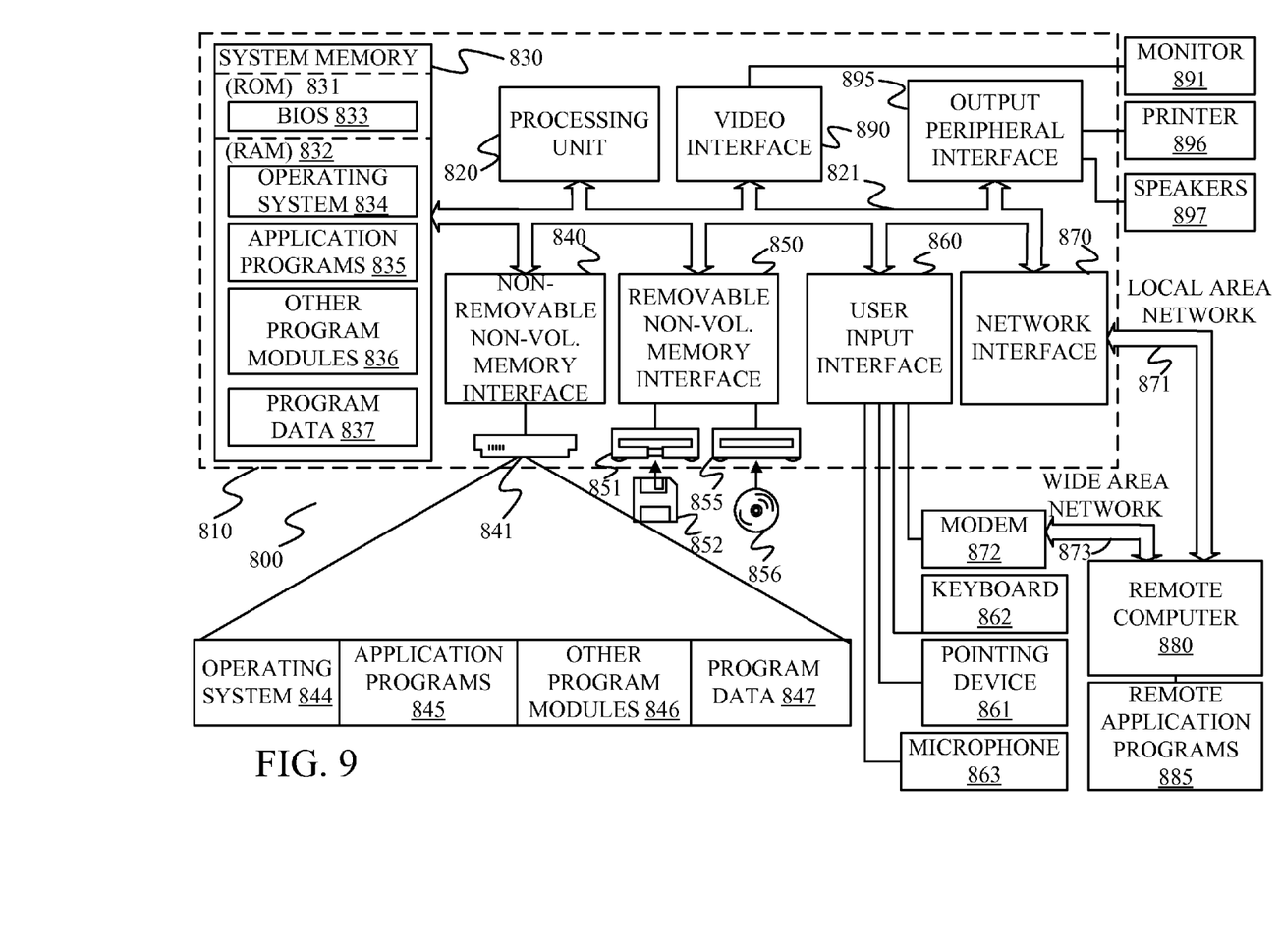
FIG. 9 is a block diagram showing one illustrative embodiment of a computing environment.

FIG. 9 is one embodiment of a computing environment in which system 100 or 160 (for example) can be deployed. With reference to FIG. 9, an exemplary system for implementing some embodiments includes a general-purpose computing device in the form of a computer 810. Components of computer 810 may include, but are not limited to, a processing unit 820 (which can comprise processor 102), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of handling events raised by a publisher, using a computer with a processor, comprising:
   detecting an event raised by the publisher;
   identifying a program entity, by identifying an event handler attribute, on the program entity itself, indicative of the program entity subscribing to the event, as an event handler; and
   invoking the identified event handler based on the event.

2. The computer-implemented method of claim 1 wherein identifying a program entity as an event handler, comprises:
   searching a plurality of different program entities for the event handler attribute; and
   returning search results as program entities that have the event handler attribute.

3. The computer-implemented method of claim 2 wherein searching the plurality of different program entities comprises:

invoking a type inspecting interface to search for the event handler attribute.

4. The computer-implemented method of claim 2 wherein searching the plurality of different program entities comprises:
performing a database query through a database storing the program entities.

5. The computer-implemented method of claim 2 wherein searching the plurality of different program entities comprises:
searching each program entity for the event handler attribute characteristic as an attribute on the program entity.

6. The computer-implemented method of claim 2 wherein searching the plurality of different program entities comprises:
scanning each program entity for the event handler attribute as a text comment on the program entity.

7. The computer-implemented method of claim 2 and further comprising:
caching the search results in a subscriber cache, associated with the event raised by the publisher.

8. The computer-implemented of claim 7 wherein identifying a program entity comprises:
in response to the event being raised a subsequent time by the publisher, searching the subscriber cache for the search results.

9. The computer-implemented method of claim 1 and further comprising:
before detecting the event raised by the publisher, attaching the event handler attribute to each of the program entities that are to subscribe to the event.

10. An event handling system, comprising:
a publishing entity that raises an event;
an entity store that stores a program entity that has an event handler attribute attached thereto indicating that the program entity has subscribed to the event raised by the publisher entity;
a search component that searches the entity store when the publishing entity raises the event to identify the program entity that has the associated event handler attribute attached to the program entity itself;
an invoking component that invokes the identified program entity based on the event raised by the publishing entity; and
a computer processor being a functional component of the system and activated by the search component and the invoking component to facilitate searching and invoking.

11. The event handling system of claim 10 wherein the event handler attribute comprises an attribute attached to the program entity and wherein the search component is configured to invokes a type inspecting interface to search the entity store for the program entity that has the attribute.

12. The event handling system of claim 10 and further comprising:
a subscriber cache that stores program entities, that subscribe to different events, identified by the search component.

13. The event handling system of claim 12 wherein, after a given publisher raises a given event a first time, the search component is configured to search the subscriber cache each time the given publisher subsequently raises the given event.

14. The event handling system of claim 10 wherein the search component comprises:
a database search component searching the entity store to identify the program entity.

15. The event handling system of claim 10 wherein the event handler attribute comprises a text comment on the program entity and wherein the search component comprises a text search component that searches the entity store for a program entity with the text comment.

16. The event handling system of claim 10 and further comprising:
an event subscription system that generates a developer interface that receives subscription inputs attaching the event handler attribute to the program entity.

17. The event handling system of claim 10 wherein the program entity comprises one of an assembly, a module, a class, a property, a method and a type.

18. The event handling system of claim 10 wherein the invoking component is configured to invokes a reflection application programming interface on the program entity.

19. The event handling system of claim 10 and further comprising:
an event raising component configured to detect that the publishing entity has raised the event.

20. A computer-implemented method of handling an event, comprising:
storing in a data store a plurality of program entities each with an associated event handler attribute that indicates an event that the associated program entity subscribes to;
detecting that a given publishing entity has raised a given event;
searching the data store to identify program entities that have an associated event handler attribute, on the program entities themselves, that corresponds to the given event detected;
invoking a method on the identified program entities, based on the given event raised by the given publisher entity;
caching the identified program entities in a cache; and
detecting that the given publisher entity has raised the given event a subsequent time and, in response, searching the cache to identify program entities.

* * * * *